T. S. Hudson.
Manuf. of Inkstands.
№ 94,113. Patented Aug. 24. 1869.
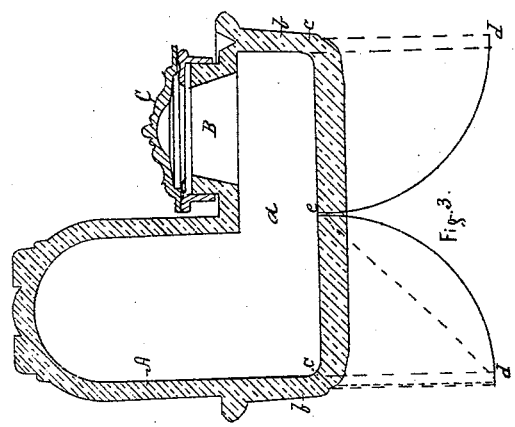
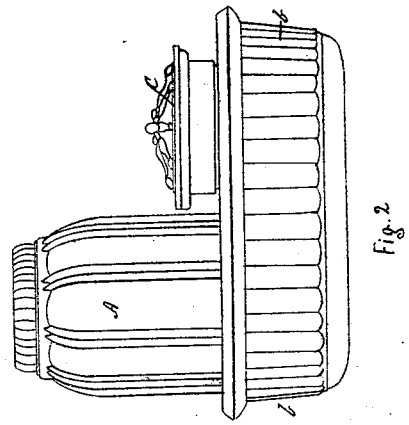
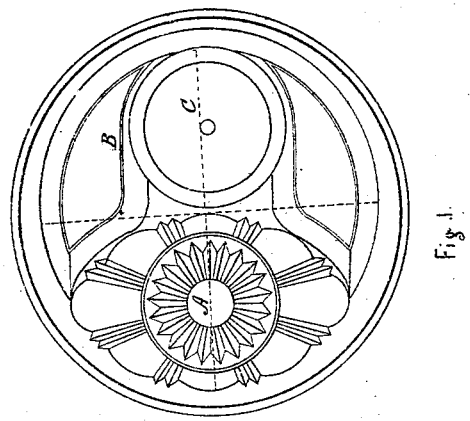
Witnesses.
N. W. Stearns
W. J. Cambridge
Inventor
Thos. S. Hudson

UNITED STATES PATENT OFFICE.

THOMAS S. HUDSON, OF EAST CAMBRIDGE, MASSACHUSETTS.

IMPROVEMENT IN THE MANUFACTURE OF INKSTANDS.

Specification forming part of Letters Patent No. 94,113, dated August 24, 1869.

*To all whom it may concern:*

Be it known that I, THOMAS S. HUDSON, of East Cambridge, in the county of Middlesex and State of Massachusetts, have invented certain Improvements in Fountain or Barometer Stands for Ink, Mucilage, &c., of which the following is a full, clear, and exact description, reference being had to the accompanying drawings, making part of this specification, in which—

Figure 1 is a plan representing my improved barometer-stand for holding ink, mucilage, &c. Fig. 2 is an elevation of the same. Fig. 3 is a central vertical section, representing the manner in which the bottom of the stand is formed.

My invention relates particularly to certain improvements in the construction of glass receptacles for holding ink or mucilage, provided with a hollow dome and a dipping-cup, usually denominated "fountain" or "barometer" inkstands or mucilage-stands; and my invention consists in extending the sides of the stand to a sufficient length to admit of their first being shaped into flaps, and these flaps being "closed in" toward the center of the stand to form its bottom, in contradistinction to making the bottom and upper portion of the stand in separate pieces and afterward uniting them together.

To enable others skilled in the art to understand and use my invention, I will proceed to describe the manner in which I have carried it out.

In the said drawings, A is the hollow dome, B the dipping-cup, and C the cap or cover of the latter, the interior of the dome and dipping-cup, with the open space $a$ between them, serving as a receptacle for holding ink, mucilage, &c.

The glass is first pressed by a plunger into a mold of the required shape to form the dome and dipping-cup, with the circular side $b$ of the stand extended down, as seen in red, Fig. 3, around the plunger, sufficiently beyond the line which is to form the bottom to enable the sides to be brought in and united at the center, as seen in Fig. 3, in the following manner: The pressed glass is removed from the mold, and is held in a suitable block or "former," and on the extended portion of the circular side, from $c$ to $d$, being again heated, the glass is rolled over, while the "shears" grasp the portion $c\,d$ of the side below the line intended for the bottom, and close in the edge or periphery $d$ at the center.

It is evident that the above-described stand will serve as a receptacle for various purposes other than for holding ink—for instance, for holding mucilage—without departing from the spirit of my invention.

I am aware that the bottoms and main portions of inkstands and other articles of glass have been made in separate pieces and afterward pressed into place. To this feature, therefore, I lay no claim in the present application.

What I claim as my invention, and desire to secure by Letters Patent, is—

Forming the bottom of a glass ink or mucilage stand by first shaping into flaps its extended side or sides, and then closing in these flaps, substantially as described.

THOS. S. HUDSON.

Witnesses:
L. E. BATCHELLER,
W. J. CAMBRIDGE.